United States Patent
Wu

(10) Patent No.: US 12,307,098 B2
(45) Date of Patent: May 20, 2025

(54) DATA FLUSH AT POWER LOSS

(71) Applicant: Micron Technology, Inc., Boise, ID (US)

(72) Inventor: Minjian Wu, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/508,915

(22) Filed: Nov. 14, 2023

(65) Prior Publication Data

US 2024/0168650 A1 May 23, 2024

Related U.S. Application Data

(60) Provisional application No. 63/427,640, filed on Nov. 23, 2022.

(51) Int. Cl.
*G06F 3/06* (2006.01)
*G06F 12/1009* (2016.01)

(52) U.S. Cl.
CPC .......... *G06F 3/0617* (2013.01); *G06F 3/0659* (2013.01); *G06F 3/0679* (2013.01); *G06F 12/1009* (2013.01)

(58) Field of Classification Search
None
See application file for complete search history.

(56) References Cited

U.S. PATENT DOCUMENTS

| 2018/0336229 A1* | 11/2018 | Muehle ................. G06F 16/245 |
| 2019/0287319 A1* | 9/2019 | Golov ................. G06F 11/0796 |
| 2021/0096778 A1 | 4/2021 | Nagarajan et al. |

* cited by examiner

*Primary Examiner* — Brian R Peugh
(74) *Attorney, Agent, or Firm* — Brooks, Cameron & Huebsch, PLLC

(57) ABSTRACT

Data flush at power loss can include a solid state drive (SSD) receiving a power loss notification from a host. In response to the power loss notification, the SSD can flush dirty pages from a logical-to-physical (L2P) mapping table cached in volatile memory of the SSD to an L2P mapping table stored in non-volatile memory of the SSD. In response to the power loss notification, the SSD can flush dirty pages from an L2P mapping table cached in volatile memory of the host to the L2P mapping table stored in non-volatile memory of the SSD. In response to the power loss notification, the SSD can flush time based telemetric sensor data from volatile memory to non-volatile memory of the SSD.

20 Claims, 6 Drawing Sheets

DATA FLUSH AT POWER LOSS

CLAIM OF PRIORITY

The present application claims priority to U.S. Provisional Application 63/427,640 filed Nov. 23, 2022, the contents of which are incorporated herein by reference.

TECHNICAL FIELD

The present disclosure relates generally to semiconductor memory and methods, and more particularly, to apparatuses, systems, and methods for data flush at power loss.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

Vehicles are becoming more dependent upon memory sub-systems to provide storage for components that were previously mechanical, independent, or non-existent. A vehicle can include a computing system, which can be a host for a memory sub-system. The computing system can run applications that provide component functionality. The vehicle may be driver operated, driver-less (autonomous), and/or partially autonomous. The memory device can be used heavily by the computing system in a vehicle.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1A:
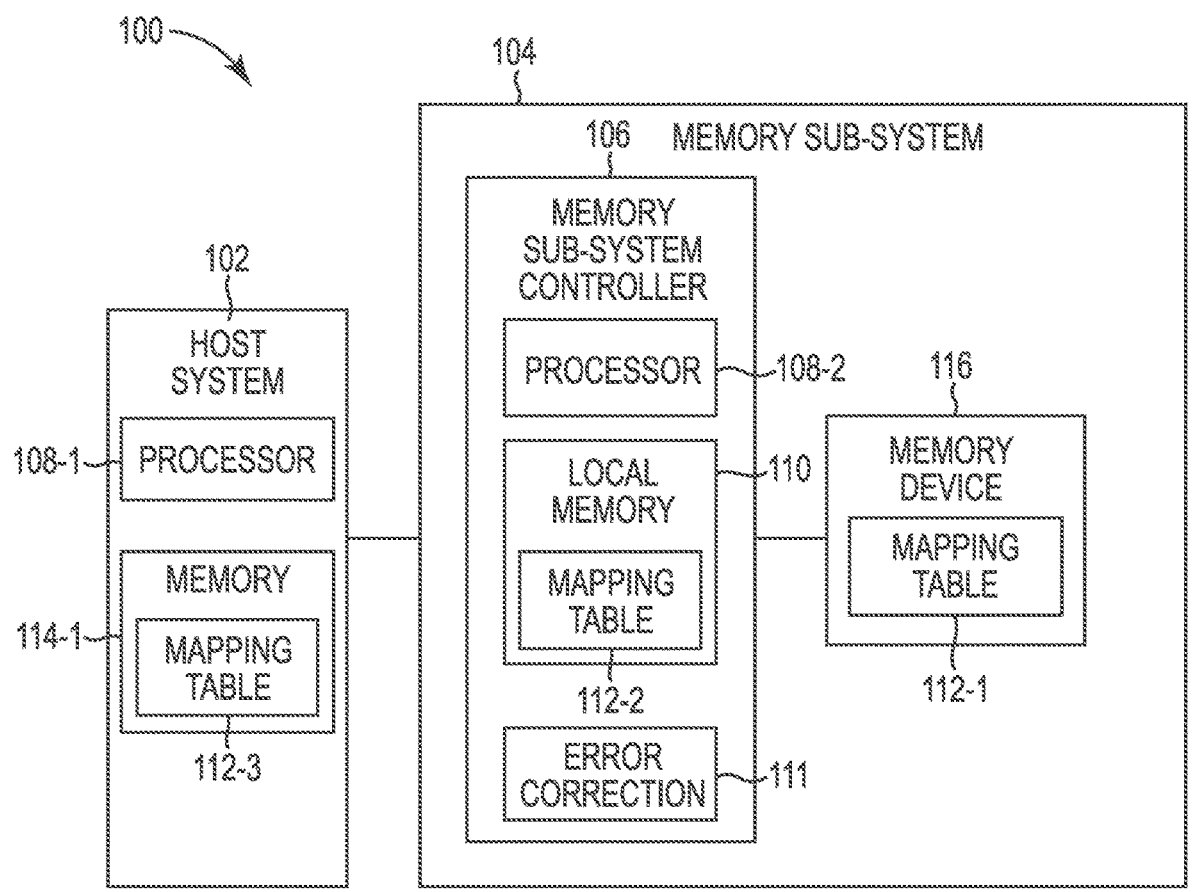
FIG. 1A is a block diagram of an example computing system that includes a memory sub-system in accordance with some embodiments of the present disclosure.

Aspects of the present disclosure are directed to flushing data at power loss for a vehicle memory sub-system. A vehicle can include a memory sub-system, such as a solid state drive (SSD). The memory sub-system can be used for storage of data by applications that are run by a host system of the vehicle. Examples of such an application include a black box of the vehicle, a telemetry system of the vehicle, and an infotainment system of the vehicle. The memory sub-systems used to store the data associated with such applications in vehicles may be derived from memory systems used in mobile devices such as mobile phones, laptops, tablets, etc. However, there are significant differences in the usage patterns of memory sub-systems associated mobile devices and vehicles. For example, vehicles may be subjected to a wider temperature range than mobile devices, which requires better cross-temperature features for the memory sub-system. Also, the memory sub-systems associated with vehicles may be expected to have a longer lifetime (e.g., 10 years instead of three years), which produces an increased expectancy for endurance and retention. Furthermore, vehicle systems are becoming more complex, such as by using virtualization technology to integrate vehicle applications into a single system, producing an expectation for higher performance and lower access latency for the memory sub-system. Most mobile systems are always (or almost always) on with frequent idle time (e.g., when the user doesn't touch the screen) allowing the memory sub-system to perform internal management operations. In contrast, vehicles are frequently powered off and while on, are rarely in an idle status.

The increased endurance expectation for the memory sub-system may be associated with increased write amplification. Write amplification is a process that occurs when writing data to solid state memory arrays. When randomly writing data in a memory array, the memory array scans for free space in the array. Free space in a memory array can be individual cells, pages, and/or blocks of memory cells that are not programmed. If there is enough free space to write the data, then the data is written to the free space in the memory array. If there is not enough free space in one location, the data in the memory array is rearranged by erasing, moving, and rewriting the data that is already present in the memory array to a new location leaving free space for the new data that is to be written in the memory array. The rearranging of old data in the memory array can be called write amplification because the amount of writing the memory arrays has to do in order to write new data is amplified based upon the amount of free space in the memory array and the size of the new data that is to be written on the memory array.

Write amplification can be ameliorated by caching dirty pages in a logical-to-physical (L2P) mapping table. "Dirty pages" are entries in an L2P mapping table for which the mapping between a particular logical address and a corresponding physical address has changed. Those dirty pages are cached in an L2P mapping table (e.g., cached in volatile memory) but have not yet been updated or stored in an L2P mapping table (e.g., stored in non-volatile memory). Some approaches may cache dirty pages in volatile memory that is local to the host or otherwise not resident on the memory sub-system, particularly when the memory sub-system does not include or does not use volatile memory local to the memory sub-system. Caching the dirty pages in host memory can improve read/write latency. However, in the event of a sudden power loss, cached dirty page information may be lost and/or may increase the time used to initialize the memory sub-system after the next power cycle because the L2P mapping table may need to be rebuilt. However, system boot time is very important for vehicle systems. For example, some vehicle systems require the back-up camera to be ready in 1.0 to 1.2 seconds from system power-on. As another example, some vehicle systems require the domain control gateway to be ready within 2.0 seconds from system power-on.

Another difficulty associated with sudden power loss for vehicle memory sub-systems is the potential loss of sensor data (e.g., associated with a black box application). The sensor data can be time based telemetric sensor data and may normally be buffered (e.g., cyclic buffer) in volatile memory before being stored in non-volatile memory. When an event (e.g., an accident) occurs, the time based telemetric sensor data is flushed to the non-volatile memory. However, data stored in volatile memory may be lost in the event of a power loss. Therefore, some approaches include the use of backup power supplies to allow for flushing the time based telemetric sensor data from volatile memory to non-volatile memory.

Aspects of the present disclosure address the above and other deficiencies by providing a memory sub-system for vehicles that can take various actions in response to being notified of a power loss event. For example, the memory sub-system can flush dirty pages from L2P mapping tables stored in volatile memory in the host or in the memory sub-system to non-volatile memory of the memory sub-system. This can advantageously reduce initialization time of the memory sub-system subsequent to being shut down in relation to the power loss event. The reduced initialization time can improve boot time for various vehicle applications that use the memory sub-system for storage. As another example, the memory sub-system can buffer time based telemetric sensor data in volatile memory of the memory sub-system (e.g., without requiring buffering in volatile memory of the host system) and flush the time based telemetric sensor data from the volatile memory of the memory sub-system to non-volatile memory of the memory sub-system in response to being notified of the power loss event. This can advantageously reduce a reliance on a backup power supply of the host system to preserve the time based telemetric sensor data in case of a power loss event. For example, the memory sub-system can use a backup power supply to complete the operation even if the host system completely loses power and/or functionality.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1A, and a similar element may be referenced as 210 in FIG. 2. Analogous elements within a Figure may be referenced with a hyphen and extra numeral or letter. Such analogous elements may be generally referenced without the hyphen and extra numeral or letter. For example, elements 108-1 and 108-2 in FIG. 1A may be collectively referenced as 108. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

Figure 1B:
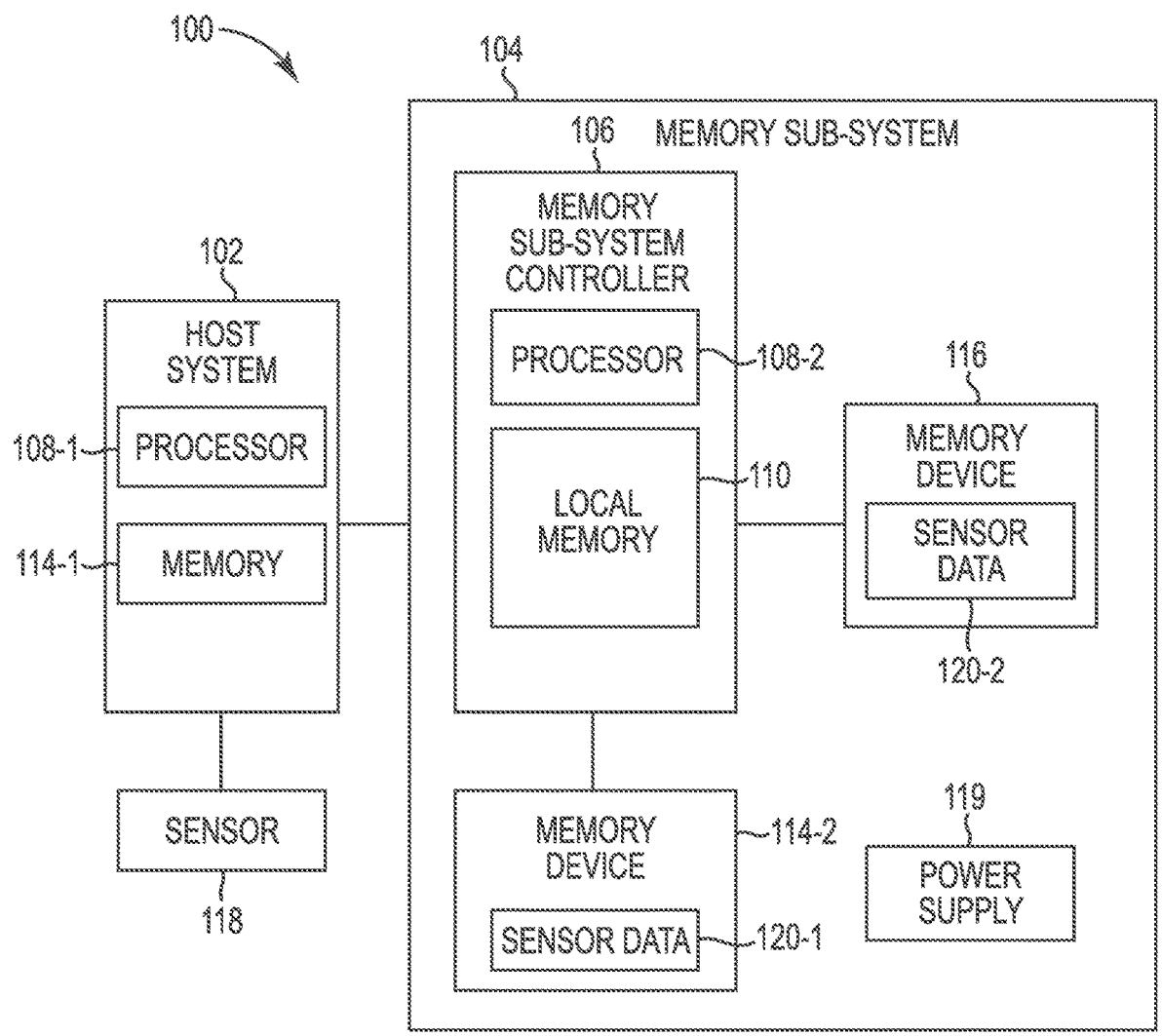
FIG. 1B is a block diagram of an example computing system that includes a memory sub-system in accordance with some embodiments of the present disclosure.

FIG. 1A and FIG. 1B are block diagrams of an example computing system 100 that includes a memory sub-system 104 in accordance with some embodiments of the present disclosure. The memory sub-system 104 can include media, such as one or more volatile memory devices 114-2 as illustrated in FIG. 1B, one or more non-volatile memory devices 116, or a combination thereof. In some embodiments, the memory sub-system 104 does not include a non-volatile memory device external to the memory sub-system controller 106, as illustrated in FIG. 1A. The volatile memory devices 114-2 can be, but are not limited to, random access memory (RAM), such as dynamic random access memory (DRAM), synchronous dynamic random access memory (SDRAM), and resistive DRAM (RDRAM). The memory sub-system 104 can also include additional circuitry or components that are not illustrated. In some embodiments, the memory sub-system 104 can include address circuitry (e.g., a row decoder and a column decoder) that can receive an address from the memory sub-system controller 106 and decode the address to access the non-volatile memory devices 116.

A memory sub-system 104 can be a storage device, a memory module, or a hybrid of a storage device and memory module. Examples of a storage device include an SSD, a flash drive, a universal serial bus (USB) flash drive, an embedded Multi-Media Controller (eMMC) drive, a Universal Flash Storage (UFS) drive, a secure digital (SD) card, and a hard disk drive (HDD). In at least one embodiment, the memory sub-system 104 is an automotive grade SSD. Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 includes a host system 102 that is coupled to one or more memory sub-systems 104. In some embodiments, the host system 102 is coupled to different types of memory sub-systems 104. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 102 includes or is coupled to processing resources, memory resources, and network resources. As used herein, "resources" are physical or virtual components that have a finite availability within a computing system 100. For example, the processing resources include a processor 108-1 (or a number of processing devices), the memory resources include volatile memory 114-1 for primary storage, and the network resources include as a network interface (not specifically illustrated). The processor 108-1 can be one or more processor chipsets, which can execute a software stack. The processor 108-1 can include one or more cores, one or more caches, a memory controller (e.g., NVDIN controller), and a storage protocol controller (e.g., PCIe controller, SATA controller, etc.). The host system 102 uses the memory sub-system 104, for example, to write data to the memory sub-system 104 and read data from the memory sub-system 104.

The host system 102 can be configured to provide virtualized or non-virtualized access to the memory sub-system 104 and/or the processing resources and network resources. Virtualization can include abstraction, pooling, and automation of the processing, memory, and/or network resources. To provide such virtualization, the host system 102 can incorporates a virtualization layer (e.g., hypervisor, virtual machine monitor, etc.) that can execute a number of virtual computing instances (VCIs). The virtualization layer 108 can provision the VCIs with processing resources and memory resources and can facilitate communication for the VCIs via the network interface. The virtualization layer represents an executed instance of software run by the host system 102. The term "virtual computing instance" covers a range of computing functionality. VCIs may include non-virtualized physical hosts, virtual machines (VMs), and/or containers. Containers can run on a host operating system without a hypervisor or separate operating system, such as a container that runs within Linux. A container can be provided by a virtual machine that includes a container virtualization layer (e.g., Docker). A VM refers generally to an isolated end user space instance, which can be executed within a virtualized environment. Other technologies aside from hardware virtualization can provide isolated application instances may also be referred to as VCIs. The term "VCI" covers these examples and combinations of different types of VCIs, among others.

The host system 102 can be coupled to the memory sub-system 104 via a physical host interface. Examples of a physical host interface include, but are not limited to, a serial advanced technology attachment (SATA) interface, a PCIe interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 102 and the memory sub-system 104. The host system 102 can further utilize an NVM Express (NVMe) interface to access the non-volatile memory devices 116 when the memory sub-system 104 is coupled with the host system 102 by the PCIe interface. The physical host interface can provide an interface for passing control, address, data, and other signals between the memory sub-system 104 and the host system 102. In general, the host system 102 can access multiple memory sub-systems via a same communication connection, multiple separate communication connections, and/or a combination of communication connections.

The non-volatile memory devices 116 can be not-and (NAND) type flash memory. NAND type flash memory includes, for example, two-dimensional NAND (2D NAND) and three-dimensional NAND (3D NAND). The non-volatile memory devices 116 can be other types of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM), and three-dimensional cross-point memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

Each of the non-volatile memory devices 116 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the non-volatile memory devices 116 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the non-volatile memory devices 116 can be grouped as pages that can refer to a logical unit of the memory device used to store data. With some types of memory (e.g., NAND), pages can be grouped to form blocks.

The memory sub-system controller 106 (or controller 106 for simplicity) can communicate with the non-volatile memory devices 116 to perform operations such as reading data, writing data, erasing data, and other such operations at the non-volatile memory devices 116. The memory sub-system controller 106 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 106 can be a microcontroller, special purpose logic circuitry (e.g., a field programmable gate array (FPGA), an application specific integrated circuit (ASIC), etc.), or other suitable circuitry.

The memory sub-system controller 106 can include a processor 108-2 configured to execute instructions stored in local memory 110. The local memory 110 of the memory sub-system controller 106 can be an embedded memory configured to store instructions for performing various processes, operations, logic flows, and routines that control operation of the memory sub-system 104, including handling communications between the memory sub-system 104 and the host system 102. The local memory 110 can be volatile memory, such as static random access memory (SRAM).

In some embodiments, the local memory 110 can include memory registers storing memory pointers, fetched data, etc. The local memory 110 can also include ROM for storing micro-code, for example. While the example memory sub-system 104 has been illustrated as including the memory sub-system controller 106, in another embodiment of the present disclosure, a memory sub-system 104 does not include a memory sub-system controller 106, and can instead rely upon external control (e.g., provided by an external host, or by a processor or controller separate from the memory sub-system 104).

In general, the memory sub-system controller 106 can receive information or operations from the host system 102 and can convert the information or operations into instructions or appropriate information to achieve the desired access to the non-volatile memory devices 116 and/or the volatile memory devices 110, 114-2. The memory sub-system controller 106 can be responsible for other operations such as media management operations (e.g., wear leveling operations, garbage collection operations, defragmentation operations, read refresh operations, etc.), error detection and/or correction operations, encryption operations, caching operations, and address translations between a logical address (e.g., logical block address) and a physical address (e.g., physical block address) associated with the non-volatile memory devices 116. The memory sub-system controller 106 can use error correction code (ECC) circuitry 111 to provide the error correction and/or error detection functionality. The ECC circuitry 111 can encode data by adding redundant bits to the data. The ECC circuitry 111 can decode error encoded data by examining the ECC encoded data to check for any errors in the data. In general, the ECC circuitry 111 can not only detect the error but also can correct a subset of the errors it is able to detect. The memory sub-system controller 106 can further include host interface circuitry to communicate with the host system 102 via the physical host interface. The host interface circuitry can convert a query received from the host system 102 into a command to access the non-volatile memory devices 116 and/or the volatile memory device 114-2 as well as convert responses associated with the non-volatile memory devices 116 and/or the volatile memory device 114-2 into information for the host system 102.

In some embodiments, the non-volatile memory devices 116 include a local media controller that operates in conjunction with memory sub-system controller 106 to execute operations on one or more memory cells of the memory devices 116. An external controller (e.g., memory sub-system controller 106) can externally manage the non-volatile memory device 116 (e.g., perform media management operations on the memory device 116). In some embodiments, a memory device 116 is a managed memory device, which is a raw memory device combined with a local controller for media management within the same memory device package. An example of a managed memory device is a managed NAND device.

The host system 102 can send requests to the memory sub-system 104, for example, to store data in the memory sub-system 104 or to read data from the memory sub-system 104. The data to be written or read, as specified by a host request, is referred to as "host data." A host request can include logical address information. The logical address information can be a logical block address (LBA), which may include or be accompanied by a partition number. The logical address information is the location the host system associates with the host data. The logical address information can be part of metadata for the host data. The LBA may also correspond (e.g., dynamically map) to a physical address, such as a physical block address (PBA), that indicates the physical location where the host data is stored in memory.

In some approaches, the host system 102 can serve as a host memory buffer (HMB) for the memory sub-system 104 by allocating a portion of host memory 114-1 for use by the memory sub-system 104. The HMB functionality of the host system 102 can be enabled or disabled dynamically. As illustrated in FIG. 1A, the memory sub-system 104 may not have volatile memory (e.g., DRAM) external to the controller 106 (e.g., volatile memory 114-2 as illustrated in FIG. 1B). The memory sub-system 104 can use the portion of the host memory 114-1 to cache an L2P mapping table 112-3. The memory sub-system 104 can also cache an L2P mapping table 112-2 in the memory 110 local to the controller 106. The L2P mapping table 112-2 cached in the memory 110 local to the controller 106 and/or the L2P mapping table 112-3 cached in the host memory 114-1 may be only a portion of the entire L2P mapping table. For example, the cached L2P mapping tables 112-2, 112-3 may include changes that have occurred since the L2P mapping table 112-1 was last updated in the non-volatile memory 116. Any changes to the L2P mapping table cached in host memory 114-1 or the local memory 110 of the memory controller 106 are intended to be temporary until they are backed up to the L2P mapping table 112-1 stored in the non-volatile memory 116.

When the host system 102 issues a write command to the memory sub-system 104, the L2P mapping table 112-1, or a portion thereof, may be loaded from the non-volatile memory 116 and cached in host memory 114-1 as the L2P mapping table 112-3. This can improve performance for the host system 102, such that it does not need to access the L2P mapping table 112-1 stored in the non-volatile memory 116 of the memory sub-system for every operation, particularly those that target LBAs with relatively high frequency. The L2P mapping table 112-1 is updated after the write command is executed and data is saved in the non-volatile memory 116.

To improve performance and reduce write amplification, rather than immediately updating the L2P mapping table 112-1 in the non-volatile memory 116, the L2P mapping table 112-3 cached in the host memory 114-1 can be updated, thereby creating dirty pages. Those updates are referred to as dirty pages because the L2P mapping table 112-1 in the non-volatile memory 116 has not yet been updated. Different algorithms or rules can be put into place to determine when to update the L2P mapping table 112-1 stored in the non-volatile memory 116 (e.g., at a certain periodicity, after a certain quantity of operations, during idle time of the memory sub-system, etc.).

However, if a power loss for the host system 102 occurs before the dirty pages have been updated to the L2P mapping table 112-1 stored in the non-volatile memory 116, the dirty pages of the mapping table 112-3 cached in the host memory 114-1 may be lost. In such an event, after the next power cycle, the memory sub-system 104 would have to rebuild the mapping table 112-1 by performing physical-to-logical (P2L) translations by scanning the non-volatile memory 116, which can increase initialization time of the memory sub-system 104. Alternatively, some of the data recently written to the non-volatile memory 116 may be lost if the logical and physical addresses are not updated after the power loss event.

In some examples, the host system 102 may become aware that a power loss event is occurring or will occur. Just as one example, the host system 102 may suffer a partial or complete power loss and have a finite amount of backup power available to perform certain operations before a complete power down. The host system 102 can notify the memory sub-system 104 of the pending power loss event. In such examples, the memory sub-system 104 is still supplied with power, such as from a primary power supply and/or a backup power supply (e.g., power supply 119 illustrated in FIG. 1B) for the memory sub-system. The backup power supply 119 is not illustrated in FIG. 1A merely to illustrate different possible implementations of the memory sub-system 104. Unless specifically stated otherwise, embodiments are not limited to the memory sub-system 104 including or not including its own backup power supply 119.

Although not specifically illustrated in FIG. 1A or FIG. 1B, the host interface between the memory sub-system 104 and the host system 102 can include a plurality of contacts (e.g., pins) for communication and control between the host system 102 and the memory sub-system 104. For example, one contact can be a power loss notification contact (PLN #), by which a signal may be sent from the host system 102 to the memory sub-system to notify the memory sub-system of a power loss event. For example, the host may drive the PLN # signal low to inform the memory sub-system 104 of the power loss event. Another example contact can be a power loss acknowledge contact (PLA #), by which the memory sub-system 104 can notify the host system 102 that the memory sub-system has completed any intended operations in response to receiving the power loss notification signal from the host system 102. For example, the memory sub-system 104 may pull the PLA # signal low to indicate that the intended operations have been completed. In some embodiments, the host system 102 can cut off any remaining power being supplied to the memory sub-system 104 after receiving the power loss acknowledge signal.

In response to receiving the power loss notification signal from the host system 102, the memory sub-system 104, by operation of the memory sub-system controller 106, can be configured to flush dirty pages from a second L2P mapping table 112-2 stored in the volatile memory device 110 to a first L2P mapping table 112-1 stored in the non-volatile memory device 116. In response to receiving the power loss notification signal from the host system 102, the memory sub-system controller 106 can be configured to flush dirty pages from a third L2P mapping table 112-3 stored in host memory 114-1 to the first L2P mapping table 112-1 stored in the non-volatile memory device 116. In response to receiving the power loss notification signal from the host system 102, the memory sub-system controller 106 can be configured to flush time based telemetric sensor data 120-1 from the volatile memory device 114-2 to the non-volatile memory device 116, where it can be written as the time based telemetric sensor data 120-2. The time based telemetric sensor data 120 can be received from one or more sensors 118 coupled to the host system 102. The sensors 118 are described in more detail with respect to FIG. 3.

The memory sub-system controller 106 can be configured to send the power loss acknowledge signal to the host system 102 in response to completion of the dirty pages from the second L2P mapping table 112-2 and the third L2P mapping table 112-3 being written to the first L2P mapping table 112-1. In some embodiments, the memory sub-system controller 106 can be configured to cause the dirty pages to be written to the non-volatile memory device 116 with error correction information generated by the ECC circuitry 111, which can beneficially reduce the impact of any errors that may be introduced by a bus from the host memory 114-1 and/or from the local memory 110, particularly if such bus has a diminished capacity due to the power loss event.

Figure 1C:
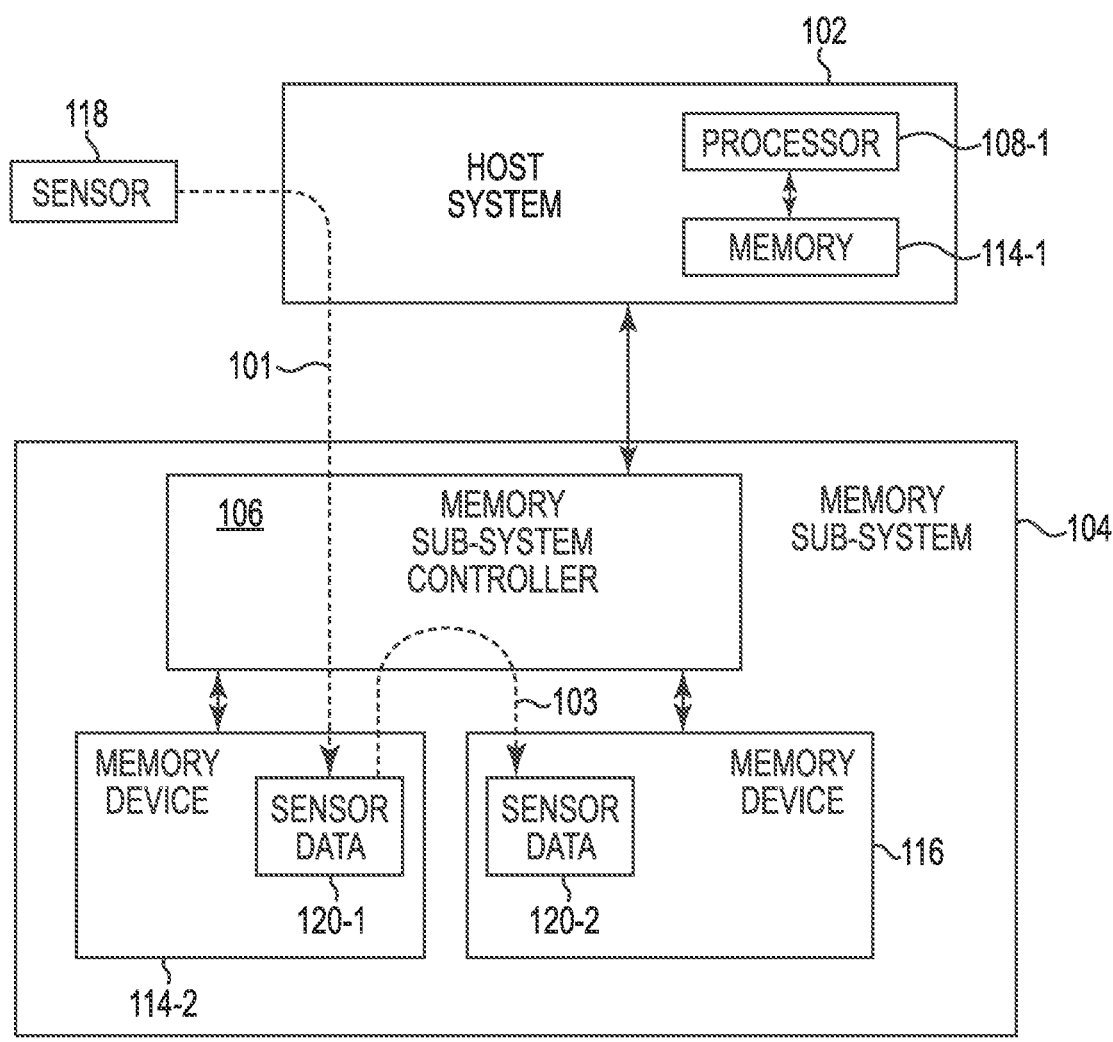
FIG. 1C is a block diagram illustrating a data path for time based telemetric sensor data in accordance with some embodiments of the present disclosure.
Figure 1C:
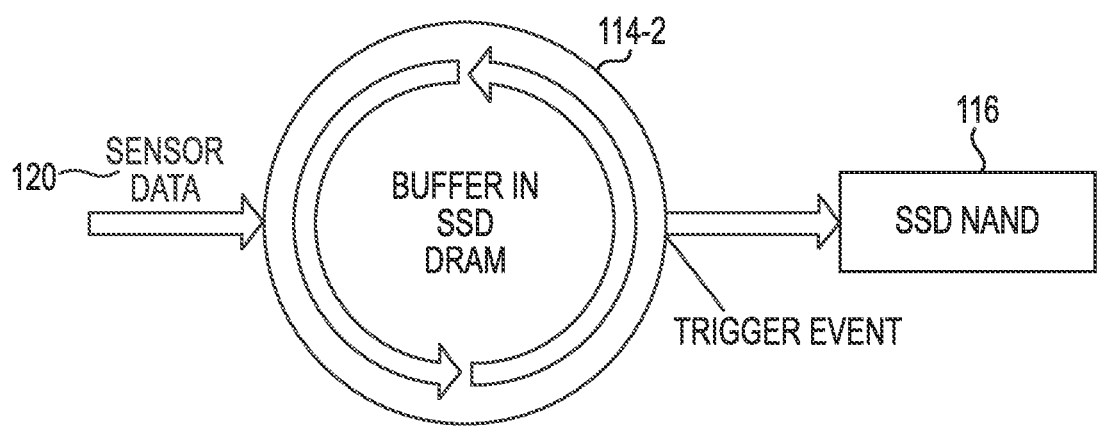

FIG. 1C is a block diagram illustrating a data path for time based telemetric sensor data in accordance with some embodiments of the present disclosure. In some previous approaches, time based telemetric sensor data 120 may have been buffered in host memory 114-1. In such approaches, an event could trigger the host system 102 to flush the time based telemetric sensor data to the memory sub-system 104. However, if the event includes a loss of power supplied to the host memory 114-1, that data could be lost unless a backup power supply is provided for the host memory 114-1. In contrast, according to at least one embodiment of the present disclosure, the host system 102 can be configured to transmit the time based telemetric sensor data to the memory sub-system 104 without buffering the data in the host memory 114-1 in normal operation (e.g., prior to any power loss event) as indicated by the dashed line 101. This allows the host system 102 to perform a shutdown process without transferring time based telemetric sensor data from the host memory 114-1 to the memory sub-system 104 subsequent to providing a power loss notification signal to the memory sub-system. The memory controller 106 can be configured to buffer the time based telemetric sensor data 120-1 in the volatile memory 114-2 of the memory sub-system 104 as indicated by the end of the dashed line 101. Buffering the time based telemetric sensor data in the volatile memory 114-2 of the memory sub-system 104 can be advantageous over buffering it in the non-volatile memory 116 because it reduces wear on the non-volatile memory and because it can decrease the latency of the buffering process. In some examples, such buffering can occur for time based telemetric sensor data for defined quantities of time (e.g., every 30 seconds worth of data from the sensors 118).

The memory controller 106 can be configured to flush time based telemetric sensor data 120-1 from the volatile memory device 114-2 to the non-volatile memory device 116, where it can be written as the time based telemetric sensor data 120-2 as indicated by the dashed line 103. The memory sub-system 104 can be configured to use the backup power supply 119 to flush the time based telemetric sensor data 120-1 from the volatile memory 114-2 to non-volatile memory 116 in response to a default power supply (not specifically illustrated) not being available. In some embodiments, the default power supply can be provided by the host system 102. In some embodiments, the backup power supply 119 can be holdup capacitors.

Figure 2:
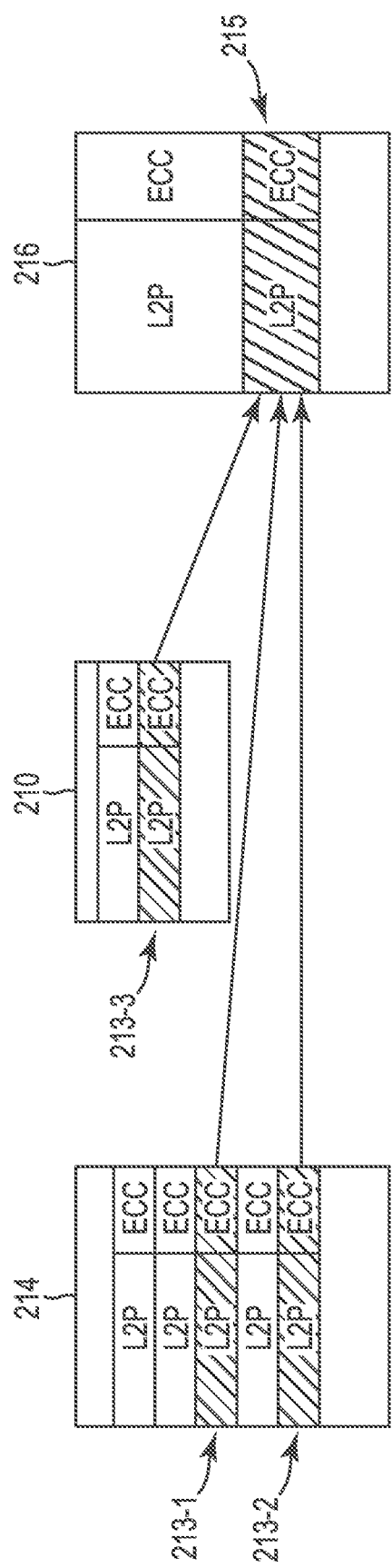
FIG. 2 is a block diagram of an example of flushing dirty pages of a logical-to-physical mapping table in accordance with some embodiments of the present disclosure.

FIG. 2 is a block diagram of an example of flushing dirty pages of a logical-to-physical mapping table in accordance with some embodiments of the present disclosure. The block diagram includes a representation of the host memory 214, a representation of the SRAM 210 of the SSD controller, and a representation of the non-volatile memory 216 of the SSD. The host memory 214 stores an L2P mapping table with several pages indicated as "L2P" along with error correction information indicated as "ECC". The SRAM 210 stores an L2P mapping table with several pages indicated as "L2P" along with error correction information indicated as "ECC". The non-volatile memory 216 of the SSD stores an L2P mapping table with several pages indicated as "L2P" along with error correction information indicated as "ECC".

The L2P mapping table in the host memory 214 includes dirty pages 213-1, 213-2 indicated with crosshatch. The L2P mapping tale in the SRAM 210 includes a dirty page 213-3 indicated with crosshatch. The diagram illustrates that the dirty pages can be flushed from the host memory 214 and/or from the SSD SRAM 210 to the non-volatile memory 216 of the SSD by the arrows coming form the dirty pages 213. The dirty pages can be written to the L2P mapping table in the non-volatile memory of the SSD as indicated at 215. During a subsequent power cycle, the L2P information can be read directly from the non-volatile memory 216 of the SSD without performing physical-to-logical translation to recreate the L2P table. Thus, the initialization time of the SSD can be reduced.

Figure 3:
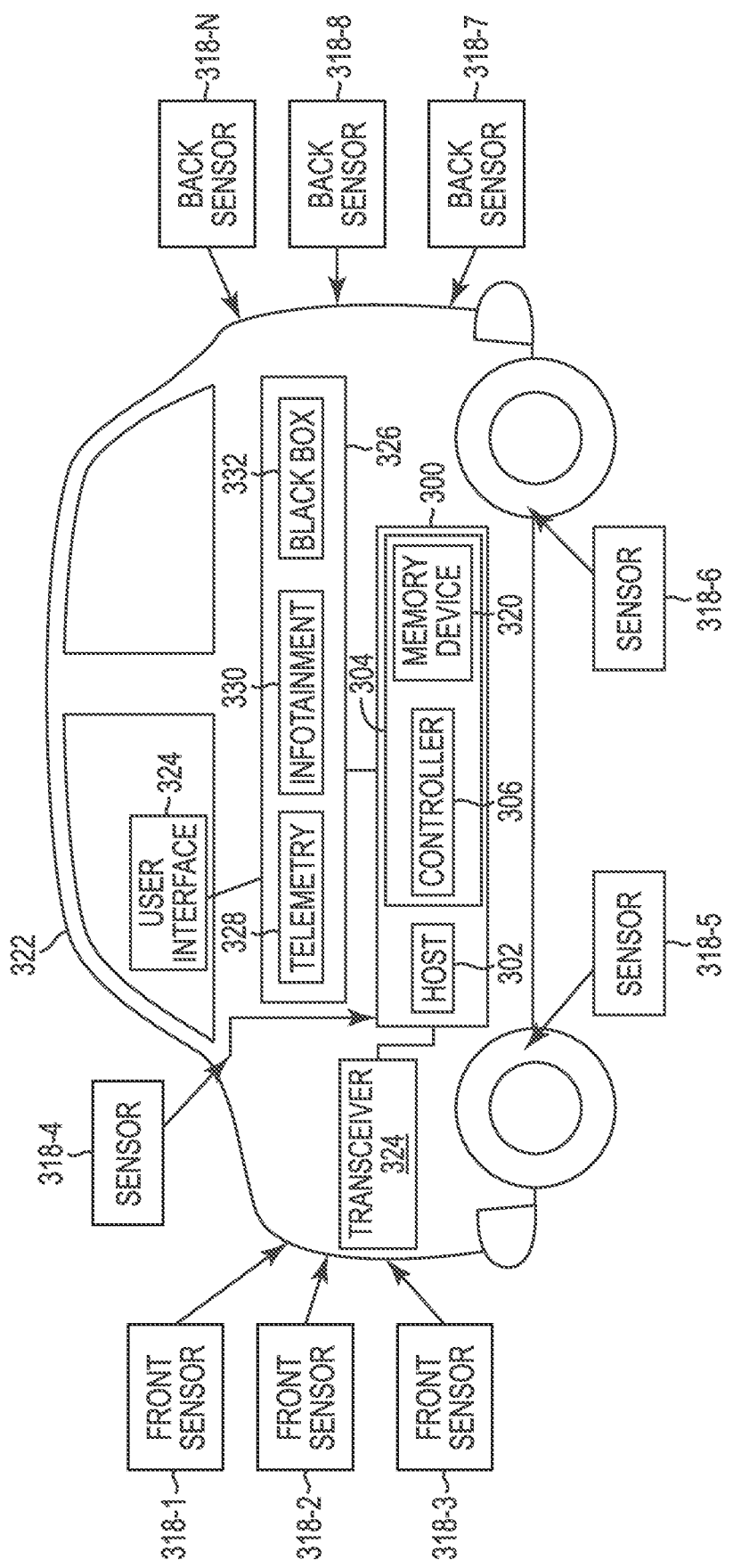
FIG. 3 illustrates an example of a system including a computing system in a vehicle in accordance with some embodiments of the present disclosure.

FIG. 3 illustrates an example of a system including a computing system 300 in a vehicle 322 in accordance with some embodiments of the present disclosure. The computing system 300 can include a memory sub-system 304, which is illustrated as including a controller 306 and non-volatile memory device 316 for simplicity but is analogous to the memory sub-system 104 illustrated in FIG. 1A and FIG. 1B.

The computing system 300, and thus the host 302, can be coupled to a number of sensors 318 either directly, as illustrated for the sensor 318-4 or via a transceiver 324 as illustrated for the sensors 318-1, 318-2, 318-3, 318-5, 318-6, 318-7, 318-8, . . . , 318-N. The transceiver 324 is able to receive data from the sensors 318 wirelessly, such as by radio frequency communication. In at least one embodiment, each of the sensors 318 can communicate with the computing system 300 wirelessly via the transceiver 324. In at least one embodiment, each of the sensors 318 is connected directly to the computing system 300 (e.g., via wires or optical cables).

The vehicle 322 can be a car (e.g., sedan, van, truck, etc.), a connected vehicle (e.g., a vehicle that has a computing capability to communicate with an external server), an autonomous vehicle (e.g., a vehicle with self-automation capabilities such as self-driving), a drone, a plane, a ship, and/or anything used for transporting people and/or goods. The sensors 318 are illustrated in FIG. 3 as including example attributes. For example, sensors 318-1, 318-2, and 318-3 are cameras collecting data from the front of the vehicle 322. Sensors 318-4, 318-5, and 318-6 are microphone sensors collecting data from the from front, middle, and back of the vehicle 322. The sensors 318-7, 318-8, and 318-N are cameras collecting data from the back of the vehicle 322. As another example, the sensors 318-5, 318-6 are tire pressure sensors. As another example, the sensor 318-4 is a navigation sensor, such as a global positioning system (GPS) receiver. As another example, the sensor 318-6 is a speedometer. As another example, the sensor 318-4 represents a number of engine sensors such as a temperature sensor, a pressure sensor, a voltmeter, an ammeter, a tachometer, a fuel gauge, etc. As another example, the sensor 318-4 represents a camera. Video data can be received from any of the sensors 318 associated with the vehicle 322 comprising cameras. In at least one embodiment, the video data can be compressed by the host 302 before providing the video data to the memory sub-system 304.

The host 302 can execute instructions to provide an overall control system and/or operating system for the vehicle 322. The host 302 can be a controller designed to assist in automation endeavors of the vehicle 322. For example, the host 302 can be an advanced driver assistance system (ADAS) controller, which may be referred to herein as an ADAS host 302. An ADAS can monitor data to prevent accidents and provide warning of potentially unsafe situations. For example, the ADAS can monitor sensors in the vehicle 322 and take control of vehicle 322 operations to avoid accident or injury (e.g., to avoid accidents in the case of an incapacitated user of a vehicle). The host 302 may need to act and make decisions quickly to avoid accidents. The memory sub-system 304 can store reference data in the non-volatile memory device 320 such that data from the sensors 318 can be compared to the reference data by the host 302 in order to make quick decisions.

The host 302 can write data received from one or more sensors 318 and store the data (e.g., in association with a black box application 332 for the vehicle). The black box application 332 may also be referred to as an accident data recorder. With the advent of autonomous vehicles, some autonomous driving requires real time buffering of telemetric data such as video cameras, RADAR, LIDAR, ultrasonic and other sensors necessary to playback the sequences preceding an accident. Upon an event, a quantity (e.g., thirty seconds) of playback time immediately preceding an event needs to be captured to determine the cause of an incident. A playback may be referred to as a "snapshot". The application that controls storage of such information is referred to herein as a black box. A black box may need to store at least a few, most recent snapshots.

The host 302 can execute instructions to provide a set of applications 326 for the vehicle 322 including telemetry 328, infotainment 330, and a black box 332. The telemetry application 328 can provide information displayable on a user interface 334 such as may be associated with the instrumentation and/or dashboard of a vehicle 322. An example of such telemetric information is the speed at which the vehicle 322 is traveling (e.g., based at least in part on data from a sensor 318). The infotainment application 330 can include information and/or entertainment for a user of the vehicle 322 displayable or interfaced via the user interface 334. Examples of such information and/or entertainment include music, movies, GPS information such as a moving map, etc. The memory sub-system 304 can provide storage for any of the set of applications 326. The set of applications 326 can be virtualized, as described with respect to FIG. 1A and FIG. 1B, with backing storage provided by the memory sub-system 304.

Figure 4:
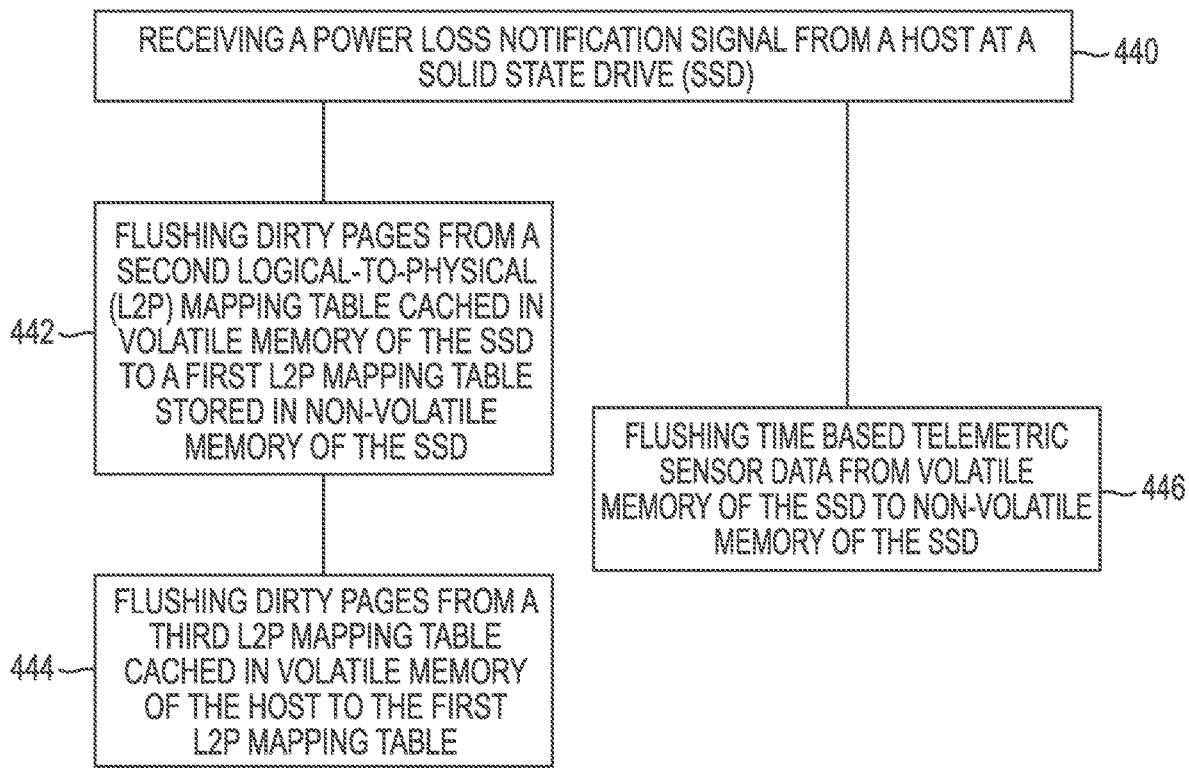
FIG. 4 is a flow diagram of an example method for data flush at power loss in accordance with some embodiments of the present disclosure.

FIG. 4 is a flow diagram of an example method for data flush at power loss in accordance with some embodiments of the present disclosure. The method can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by or using the memory sub-system 104 and/or the memory sub-system controller 106 shown in FIG. 1A and FIG. 1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 440 in the example method of FIG. 4, the method can include receiving a power loss notification signal from a host at an SSD. The power loss notification can be received via a host interface of the SSD. In some embodiments, the power loss notification can be a signal sent by the host to a power loss notification contact (e.g., pin) of the host interface of the SSD.

At block 442 in the example method of FIG. 4, the method can include, in response to receiving the power loss notification signal at 440, flushing dirty pages from a second L2P mapping table stored in volatile memory of the SSD (e.g., cache of a memory controller of the SSD) to a first L2P mapping table stored in non-volatile memory of the SSD (e.g., to flash memory of the SSD). In some embodiments, flushing the dirty pages from the second L2P mapping table to the first L2P mapping table can include writing the dirty pages to the first L2P mapping table along with error correction information.

At block 444 in the example method of FIG. 4, the method can include, in response to receiving the power loss notification signal at 440, flushing dirty pages from a third L2P mapping table stored in volatile memory of the host (e.g., host DRAM) to the first L2P mapping table. In some embodiments, flushing the dirty pages from the third L2P mapping table to the first L2P mapping table can include writing the dirty pages to the first L2P mapping table along with error correction information.

Although not specifically illustrated, the method can include, in response to completion of flushing dirty pages from the second and third L2P mapping tables, sending a power loss acknowledge signal from the SSD to the host. In some embodiments, the power loss acknowledge signal can be sent by the SSD via a power loss acknowledge contact (e.g., pin) of the host interface of the SSD. With or without sending the power loss acknowledge signal, the SSD can power down and then late be initialized subsequent to powering down. Subsequent to initializing the SSD, signals indicative of data comprising an entry from the first L2P mapping table can be sent to the host in response to a request therefor. The signals indicative of data comprising the entry from the first L2P mapping table can be sent by a controller of the SSD without scanning the first L2P mapping table to rebuild the L2P mapping table in either the volatile memory of the SSD or the volatile memory of the host. In other words, the first L2P mapping table stored in the non-volatile memory of the SSD is advantageously the complete L2P mapping table, which does not need to be rebuilt as it might in some previous approaches in which a power-loss event was experienced.

At block 446 in the example method of FIG. 4, the method can include, in response to receiving the power loss notification signal at 440, flushing time based telemetric sensor data from volatile memory of the SSD to non-volatile memory of the SSD. In some embodiments, the method can follow the path from block 440 to blocks 442 and 444 without following the path from block 440 to block 446. In some embodiments, the method can include following the path from block 440 to block 446 without following the path from block 440 to block 442 and block 444. In some embodiments, the method can simultaneously follow the paths from block 440 to two or more of blocks 442, 444, and 446. In some embodiments, the method can follow the paths from block 440 to two or more of blocks 442, 444, and 446 independently or in any sequence.

A set of instructions, for causing a machine to perform one or more of the methodologies discussed herein, can be executed. The instructions can be executed by a processing device (e.g., one or more general-purpose processing devices such as a microprocessor, a central processing unit, or the like). More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device can also be one or more special-purpose processing devices such as an ASIC, an FPGA, a digital signal processor (DSP), network processor, or the like. The processing device is configured to execute instructions for performing the operations and steps discussed herein. In some embodiments, the instructions can be communicated over a network interface device to communicate over a network.

A machine-readable storage medium (also known as a computer-readable medium) can store one or more sets of instructions or software embodying one or more of the methodologies or functions described herein. The instructions can also reside, completely or at least partially, within main memory and/or within a processing device during execution thereof by a computing system. The main memory and the processing device can also constitute machine-readable storage media.

The term "machine-readable storage medium" should be taken to include a single medium or multiple media that store the one or more sets of instructions. The term "machine-readable storage medium" should also be taken to include a medium that is capable of storing or encoding a set of instructions for execution by the machine and that cause the machine to perform one or more of the methodologies of the present disclosure. The term "machine-readable storage medium" should accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a machine-readable storage medium, such as, but not limited to, types of disks, semiconductor-based memory, magnetic or optical cards, or other types of media suitable for storing electronic instructions.

The present disclosure can be provided as a computer program product, or software, that can include a machine-readable medium having stored thereon instructions, which can be used to program a computer system (or other electronic devices) to perform a process according to the present disclosure. A machine-readable medium includes a mechanism for storing information in a form readable by a machine (e.g., a computer).

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
   in response to receiving a power loss notification signal from a host at a solid state drive (SSD):
      flushing dirty pages from a second logical-to-physical (L2P) mapping table cached in volatile memory of the SSD to a first L2P mapping table stored in non-volatile memory of the SSD; and
      flushing dirty pages from a third L2P mapping table cached in volatile memory of the host to the first L2P mapping table.

2. The method of claim 1, further comprising, in response to completion of flushing dirty pages from the second and the third L2P mapping tables, sending a power loss acknowledge signal form the SSD to the host.

3. The method of claim 1, further comprising powering down the SSD;
   initializing the SSD subsequent to powering down the SSD; and
   subsequent to initializing the SSD, sending signals indicative of data comprising an entry from the first L2P mapping table to the host in response to a request therefor.

4. The method of claim 3, wherein sending the signals indicative of the data comprising the entry from the first L2P mapping table is performed by a controller of the SSD without scanning the first L2P mapping table to rebuild the L2P mapping table in either the volatile memory of the SSD or the volatile memory of the host.

5. The method of claim 1, wherein flushing dirty pages from the second L2P mapping table further comprises writing the dirty pages to the first L2P mapping table with error correction information; and
   wherein flushing dirty pages from the third L2P mapping table further comprises writing the dirty pages to the first L2P mapping table with error correction information.

6. The method of claim 1, further comprising flushing time based telemetric sensor data from the volatile memory of the SSD to the non-volatile memory of the SSD in response to receiving the power loss notification signal.

7. A memory apparatus, comprising:
   a memory controller including a volatile memory device and control circuitry coupled to the volatile memory device;
   a host interface coupled to the memory controller; and
   a non-volatile memory device coupled to the memory controller;
   wherein the memory controller is configured to:
      flush dirty pages from a second logical-to-physical (L2P) mapping table cached in the volatile memory device to a first L2P mapping table stored in the non-volatile memory device; and
      flush dirty pages from a third L2P mapping table cached in host memory to the first L2P mapping table.

8. The memory apparatus of claim 7, wherein the memory controller is configured to flush the dirty pages from the second L2P mapping table and from the third L2P mapping table in response to receiving a power loss notification signal from the host via the host interface.

9. The memory apparatus of claim 8, wherein the host interface includes a power loss notification contact and a power loss acknowledge contact; and
   wherein the memory controller is configured to:
      receive the power loss notification signal via the power loss notification contact; and
      send a power loss acknowledge signal via the power loss acknowledge contact.

10. The memory apparatus of claim 9, wherein the memory controller is configured to send the power loss acknowledge signal in response to completion of the dirty pages from the second L2P mapping table and the third L2P mapping table being written to the first L2P mapping table.

11. The memory apparatus of claim 8, wherein the memory controller is configured to flush time based telemetric sensor data from the volatile memory device to the non-volatile memory device of the SSD in response to receiving the power loss notification signal.

12. The memory apparatus of claim 7, wherein the memory controller further includes error correction circuitry; and
   wherein the memory apparatus is configured to cause the dirty pages from the second L2P mapping table and the third L2P mapping table to be written to the non-volatile memory device with error correction information generated by the error correction circuitry for the dirty pages.

13. A memory system, comprising:
   a plurality of sensors;
   an advanced driver assistance system (ADAS) host coupled to the plurality of sensors, the ADAS host comprising a processor and volatile memory coupled to the processor;
   a solid state drive (SSD) coupled to the host, the SSD comprising:
      a volatile memory device;
      a non-volatile memory device; and
      a memory controller coupled to the volatile memory device and the non-volatile memory device;
   wherein the ADAS host is configured to:
      receive time based telemetric sensor data from the plurality of sensors; and
      transmit the time based telemetric sensor data to the SSD without buffering the time based telemetric sensor data in the volatile memory of the ADAS host;
   wherein the memory controller is configured to:
      buffer the time based telemetric sensor data received from the ADAS host in the volatile memory device of the SSD; and
      flush the time based telemetric sensor data from the volatile memory to non-volatile memory device of the SSD.

14. The memory system of claim 13, wherein the ADAS host is configured to provide a power loss notification signal to the SSD.

15. The memory system of claim 14, wherein the SSD controller is configured to flush the time based telemetric sensor data from the volatile memory to non-volatile memory device of the SSD in response to receiving the power loss notification signal.

16. The memory system of claim 15, wherein the SSD further comprises a backup power supply.

17. The memory system of claim 16, wherein the SSD is configured to use the backup power supply to flush the time based telemetric sensor data from the volatile memory to non-volatile memory device of the SSD in response to a default power supply not being available.

18. The memory system of claim 15, wherein the SSD controller includes a local volatile memory device.

19. The memory system of claim 18, wherein the SSD controller is further configured to flush dirty pages from a logical-to-physical (L2P) mapping table cached in the local volatile memory device of the SSD controller to an L2P mapping table stored in the non-volatile memory device of the SSD in response to receipt of the power loss notification signal.

20. The memory system of claim 14, wherein the ADAS host is configured to perform a shutdown process without transferring data from the volatile memory of the ADAS host to the SSD subsequent to providing the power loss notification signal to the SSD.

* * * * *